(12) United States Patent
Mickael et al.

(10) Patent No.: US 7,253,401 B2
(45) Date of Patent: Aug. 7, 2007

(54) SPECTRAL GAMMA RAY LOGGING-WHILE-DRILLING SYSTEM

(75) Inventors: Medhat W. Mickael, Sugar Land, TX (US); Dale A. Jones, Houston, TX (US); Donald A. Phelps, Arlington, TX (US); John E. Wright, Spring, TX (US)

(73) Assignee: Weatherford Canada Partnership (CA)

( * ) Notice: Subject to any disclaimer, the term of this patent is extended or adjusted under 35 U.S.C. 154(b) by 119 days.

(21) Appl. No.: 10/809,066

(22) Filed: Mar. 15, 2004

(65) Prior Publication Data

US 2005/0199794 A1 Sep. 15, 2005

(51) Int. Cl.
*G01V 5/00* (2006.01)
(52) U.S. Cl. .............. 250/261; 250/269.3; 250/252.1
(58) Field of Classification Search ............ 250/261, 250/269.3, 252.1, 254, 262, 264, 269.1, 256; 175/41, 50, 57
See application file for complete search history.

(56) References Cited

U.S. PATENT DOCUMENTS

| | | | | |
|---|---|---|---|---|
| 2,992,331 | A | | 7/1961 | Bonner et al. |
| 3,858,037 | A * | 12/1974 | Moore et al. ................ 702/8 |
| 3,928,762 | A | | 12/1975 | Peelman |
| 4,423,323 | A * | 12/1983 | Ellis et al. ................ 250/264 |
| 4,475,038 | A | | 10/1984 | Lochmann et al. |
| 4,524,273 | A * | 6/1985 | Hubner ................ 250/269.3 |
| 4,612,439 | A * | 9/1986 | Chace ................ 250/256 |
| 4,698,501 | A | | 10/1987 | Paske |
| 4,717,825 | A * | 1/1988 | Smith et al. ................ 250/256 |
| 4,814,609 | A * | 3/1989 | Wraight et al. ................ 250/254 |
| 5,091,644 | A * | 2/1992 | Minette ................ 250/254 |
| 5,120,955 | A * | 6/1992 | Galford ................ 250/256 |
| 5,235,285 | A * | 8/1993 | Clark et al. ................ 324/342 |
| 5,250,806 | A * | 10/1993 | Rhein-Knudsen et al. .. 250/254 |
| 5,397,893 | A * | 3/1995 | Minette ................ 250/254 |
| 5,461,230 | A * | 10/1995 | Winemiller ................ 250/261 |
| 5,473,158 | A * | 12/1995 | Holenka et al. ................ 250/254 |
| 5,513,528 | A * | 5/1996 | Holenka et al. ................ 73/152.03 |
| 5,517,024 | A * | 5/1996 | Mullins et al. ................ 250/254 |
| 5,600,135 | A * | 2/1997 | Jacobson ................ 250/261 |
| 5,608,214 | A | | 3/1997 | Baron et al. |
| 5,706,003 | A * | 1/1998 | Kurkoski ................ 341/118 |
| 5,804,820 | A * | 9/1998 | Evans et al. ................ 250/269.6 |
| 5,892,460 | A * | 4/1999 | Jerabek et al. ................ 340/856.4 |

(Continued)

FOREIGN PATENT DOCUMENTS

EP 0 323 773 A3 7/1989

(Continued)

*Primary Examiner*—Dave Porta
*Assistant Examiner*—Faye Boosalis
(74) *Attorney, Agent, or Firm*—Patrick H. McCollum

(57) ABSTRACT

A method for determining concentrations of naturally occurring radioactive elements in earth formation by analysis of gamma ray energy spectra measured by at least one gamma ray detector while the borehole is being drilled. Gain of the gamma ray detector is controlled automatically through analysis of the spectra. The one or more gamma ray detectors are disposed at the periphery of the downhole instrumentation to maximize sensitivity. Elemental concentrations of naturally occurring radioactive elements such as potassium, uranium and thorium are measured either as a function of depth in the borehole, or as a function of aximuthal sectors around the borehole wall, or as a function of both depth and azimuthal sectors.

56 Claims, 11 Drawing Sheets

U.S. PATENT DOCUMENTS

| | | | |
|---|---|---|---|
| 5,899,958 A * | 5/1999 | Dowell et al. | 702/6 |
| 6,005,244 A * | 12/1999 | Vaeth et al. | 250/269.2 |
| 6,037,585 A * | 3/2000 | Gadeken | 250/262 |
| 6,051,830 A * | 4/2000 | Moake | 250/252.1 |
| 6,307,199 B1 * | 10/2001 | Edwards et al. | 250/269.3 |
| 6,369,381 B1 * | 4/2002 | Troxler et al. | 250/252.1 |
| 6,376,838 B1 * | 4/2002 | Odom | 250/269.6 |
| 6,419,032 B1 * | 7/2002 | Sullivan et al. | 175/40 |
| 6,467,557 B1 * | 10/2002 | Krueger et al. | 175/45 |
| 6,564,883 B2 * | 5/2003 | Fredericks et al. | 175/50 |
| 6,619,395 B2 * | 9/2003 | Spross | 166/254.2 |
| 6,627,873 B2 * | 9/2003 | Tchakarov et al. | 250/256 |
| 6,648,083 B2 * | 11/2003 | Evans et al. | 175/41 |
| 6,649,906 B2 * | 11/2003 | Adolph et al. | 250/269.1 |
| 6,700,115 B2 * | 3/2004 | Mickael | 250/269.3 |
| 6,738,720 B2 * | 5/2004 | Odom et al. | 702/78 |
| 6,907,944 B2 * | 6/2005 | Sale et al. | 175/57 |
| 6,957,145 B2 * | 10/2005 | Spross | 702/8 |
| 6,964,303 B2 * | 11/2005 | Mazorow et al. | 166/298 |
| 2002/0043620 A1 * | 4/2002 | Tchakarov et al. | 250/269.1 |
| 2003/0101011 A1 * | 5/2003 | Odom et al. | 702/78 |
| 2004/0128073 A1 * | 7/2004 | Radtke et al. | 702/8 |

FOREIGN PATENT DOCUMENTS

| | | |
|---|---|---|
| GB | 0503512.6 | 4/2005 |
| WO | WO 00/57211 | 9/2000 |

\* cited by examiner

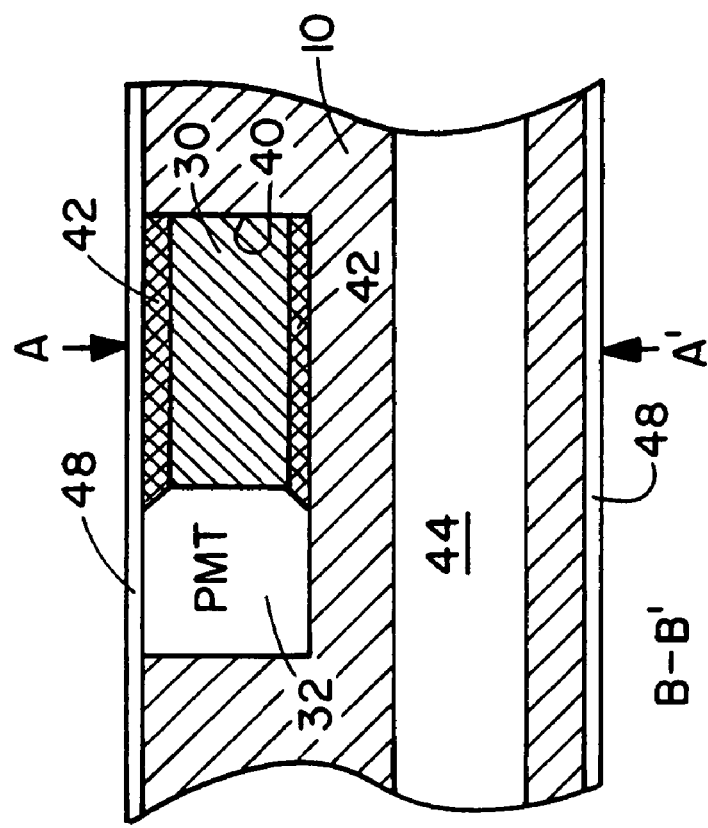
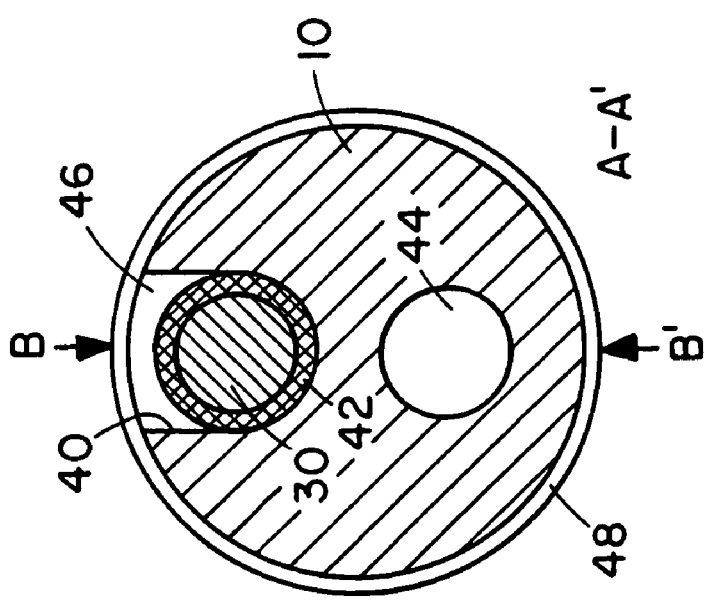
Fig. 3b
Fig. 3a

SPECTRAL GAMMA RAY LOGGING-WHILE-DRILLING SYSTEM

This invention is directed toward the measure of gamma radiation from earth formation penetrated by a well borehole. More particularly, the invention is directed toward the determination of concentrations of naturally occurring radioactive elements in earth formation by analysis of energy spectra measured by at least one gamma ray detector while the borehole is being drilled.

BACKGROUND OF THE INVENTION

The measure of naturally occurring gamma radiation as a function of depth within a well borehole is the basis of one of the earliest borehole geophysical exploration system. This type system, commonly referred to as a natural gamma ray logging system, typically comprises at least one gamma ray detector housed in a downhole tool that is conveyed along the borehole.

One type of natural gamma ray logging system comprises a logging tool that is responsive to total gamma radiation emitted by the earth formation, and the tool is conveyed along the borehole by means of a wireline. This "total" natural gamma ray wireline logging system was the first type of gamma ray measurement used in borehole geophysical exploration. Since most shales are relatively rich in naturally occurring radioactive elements, these logs are used primarily to delineate shale from other formations, or used to measure the shale content of formations. This wireline logging system is used only after the borehole has been drilled.

It is often advantageous to measure total natural gamma radiation while the borehole is being drilled. This is accomplished by conveying the tool along the borehole by means of a drill string. This type of system is commonly referred to as a total natural gamma ray logging-while-drilling (LWD) system.

Yet another type of natural gamma ray logging system comprises a logging tool that measures a spectrum of gamma radiation emitted by the earth formation. The spectrum is defined a measure of intensity of radiation as a function of radiation energy. This type of logging system is commonly referred to as a spectral gamma ray logging system. Spectral gamma ray logging tools are typically conveyed along the borehole by means of a wireline. Low count rate and detector stabilization are major problems in any type of natural spectral LWD systems Most naturally occurring gamma radiation found in earth formations is emitted by potassium (K) and elements within the decay chains of uranium (U) and thorium (Th). Energy of naturally occurring gamma radiation measurable in a borehole environment typically spans a range of about 0.1 to less than 3.0 million electron Volts (MeV). The elements K, U and Th emit gamma radiation at different characteristic energies. Components of radiation from K, U and Th contributing to the total measured gamma radiation can, therefore, be obtained by identifying these characteristic energies using spectral gamma ray logging system. Through system calibration and modeling, these components can be subsequently related to the corresponding elemental concentrations of these elements within the formation. Elemental concentrations of K, U and Th can be used to determine parameters in addition to shale content obtained from total natural gamma ray logs. These additional parameters include, but are not limited to, clay typing, lithology identification, fracture detection, and radioactive tracer placement.

As in all nuclear logging systems, statistical precision of a measurement is maximized when the count rate of the radiation detector used to obtain the measurement is maximized. Naturally occurring gamma radiation is typically much less intense than gamma radiation induced in formation materials by sources of radiation within a logging tool. It is important, therefore, to design natural gamma ray logging tools to maximized measured gamma radiation count rate.

Measured count rate can be optimized by designing tool housings (both total gamma ray and spectral gamma ray) so that gamma radiation attenuation within the housing is minimized. The lower energy region of the measured spectrum is especially important in spectral gamma ray logging systems. Wireline spectral gamma ray logging tools often employ a tool housing fabricated with material of relatively low atomic number, rather than heavier (and stronger) materials such as steel. These so called "low Z" tool cases minimize gamma ray attenuation, especially at the lower end of the energy spectrum, thereby maximizing measured count rate for a given radiation intensity and detector size. Low Z materials often do not meet structural requirements of LWD systems.

Measured count rates can further be maximized through tool detector design. Due to the relatively high energies of the characteristic K, U, and Th gamma radiation, it is advantageous for the gamma ray detector of a given type to be dimensioned as large as practically possible to react with, and thereby respond to, these radiations. Typically, larger detectors can be disposed in wireline tools with less attenuating material between the detector and the formation. LWD systems employ a relatively thick tool housing, which is typically a collar with a drilling fluid flow conduit passing through the collar.

A gamma ray detector comprising a scintillation crystal and a cooperating light sensing device, such as a photomultiplier tube, typically yields the highest spectral gamma ray detector efficiency for a given detector volume. Gamma ray detectors undergo significant temperature changes during a logging operation. The gain of a photomultiplier tube changes as the temperature and, to a lesser extent, counting rate changes. Gain changes, often referred to as gain "shifts", adversely affect gamma ray spectral analysis. Typically, a 100 degree Centigrade (° C.) change in temperature causes 100% change in gain. Temperature variations of this order of magnitude are not uncommon in wireline or LWD logging operations. It is, therefore, necessary to compensate for detector gain changes in order to obtain accurate and precise spectral gamma ray measurements. This compensation is especially difficult to achieve in LWD systems. As an example, significant gain changes can occur over a relatively short time interval. The data rates of available LWD telemetry systems between the downhole tool and surface equipment are typically too low to effectively monitor and to correct for rapidly occurring gain shifts. Automatic downhole gain control is, therefore, highly desirable in LWD systems.

As mentioned previously, naturally occurring gamma ray spectral measurements are typically low count rate. It is, therefore, desirable to use as much of the measurable gamma ray spectrum as possible in order to maximize statistical precision. Shock and vibration effects on low count rate systems can distort spectral shape, especially at the lower energy region of the measured spectrum. This problem is especially prevalent in LWD systems, which are exposed to harsh drilling environments.

SUMMARY OF THE INVENTION

This present invention is directed toward a spectral gamma ray logging-while-drilling (LWD) system. The system is designed to yield elemental concentrations of naturally occurring radioactive material such as K, U and Th. It should be understood, however, that the system can be used to obtain spectral measurements of any type of gamma radiation encountered in a borehole environment.

The LWD downhole assembly or "tool" comprises a drill collar that is attached to the lower end of a drill string. A drill bit terminates the lower end of the tool. Sensor, electronics and downhole telemetry elements are disposed within the collar. The tool is conveyed along a well borehole by means of the drill string, which is operated by a rotary drilling rig at the surface of the earth. Information from the tool is telemetered to the surface via a telemetry link and received by a surface telemetry element contained in surface equipment that is operationally attached to the drilling rig. Information can also be transmitted from the surface equipment to the tool via the telemetry link.

The sensor element comprises one or more gamma ray detectors that are disposed as close as practical to the periphery of the tool. This minimizes intervening material between the one or more detectors and the source of gamma radiation, which is earth formation penetrated by the borehole. As a result of this detector geometry, spectral degradation is minimized and measured count rate is maximized for a given detector size. The detector geometry also allows an azimuthal spectral gamma ray measurement in a plane essentially perpendicular to the axis of the tool. The one or more gamma ray detectors preferably comprises a scintillation crystal optically coupled to a light sensitive device such as a photomultiplier tube. The detector element is calibrated under known conditions and at a "standard" detector gain. The sensor element can also contain a system, such as a magnetometer, that senses the orientation of the tool within the borehole.

Output signals from the sensor element are input to the electronics element. The signals are amplified using appropriate preamplification and amplification circuits. Amplified sensor signals are then input to a processor for subsequent processing. High voltage for the one or more gamma ray detectors is provided by an adjustable high voltage power supply within the electronics element. Changes in temperature or, to a lesser extent, changes in measured gamma ray count rate result in detector gain change. Peak structure location and continuum regions of measured gamma ray spectra are monitored by the processor. Any gain change is detected using predetermined relationships and criteria stored within the processor. A gain correction signal representative of the magnitude of the gain change is generated by the processor and input to the adjustable high voltage power supply thereby adjusting detector high voltage such that the gain is restored to the standard gain. This gain control system is automatic, and requires no intervention from the surface.

With detector gain stabilized to standard gain, elemental concentrations of K, U and Th are determined in the processor using predetermined relationships. These elemental concentrations can be input to the downhole telemetry element and telemetered to the surface. Alternately, gain stabilized spectral data can be input to the downhole telemetry element and telemetered to the surface for subsequent processing. Spectral gamma ray data and elemental concentration determinations can be recorded by a data storage means within the electronics element, and subsequently extracted for processing and analysis when the tool is returned to the surface of the earth.

Elemental concentrations of K, U and Th are determined as a function of depth as the tool is conveyed along the borehole. If a plurality of gamma ray detectors is used, the gain adjusted spectral responses of the detectors are combined to obtain the desired elemental concentrations. Preferably the detector responses are combined prior to computation of elemental concentrations.

The peripheral detector geometry also allows an azimuthal spectral gamma ray measurement and corresponding azimuthal elemental concentration determinations in a plane that is essentially perpendicular to the axis of the tool. Azimuthal reference is obtained by using a tool orientation sensitive device such as a magnetometer disposed within the sensor or electronics element. If a single detector is used, azimuthal measurements can be obtained only when the tool is being rotated by the drill string. A plurality of detectors yields azimuthal information when the tool is rotating or "sliding" along the borehole without rotating.

BRIEF DESCRIPTION OF THE DRAWINGS

So that the manner in which the above recited features, advantages and objects the present invention are obtained and can be understood in detail, more particular description of the invention, briefly summarized above, may be had by reference to the embodiments thereof which are illustrated in the appended drawings.

FIG. 3a is a cross sectional view of a spectral LWD tool sensor element comprising one gamma ray detector;

FIG. 3b is a side sectional view of the sensor element comprising one gamma ray detector;

DETAILED DESCRIPTION OF THE PREFERRED EMBODIMENTS

Details of the preferred embodiments of the LWD spectral gamma ray logging system are presented in sections. System hardware is first disclosed. This is followed by disclosure of methodology used to monitor measured gamma ray spectra, and to stabilize the gain of these spectra as borehole temperature varies. Two gain stabilization methods are disclosed. With both, stabilization is accomplished in real time and without operator intervention. Once gain stabilization has been obtained, methods for determining elemental concentrations of naturally occurring K, U and Th are discussed. Finally, measures of total and azimuthal concentrations of K, U and Th are discussed, and "log" presentations of these measurements are illustrated.

The invention is directed toward the measure of gamma radiation that occurs naturally in earth formation. It should be understood, however, that the basic concepts of the invention are applicable for quantitative measurements of any type of gamma radiation wherein one or more gamma ray detectors are subject to gain shifts.

Hardware

Figure 1:
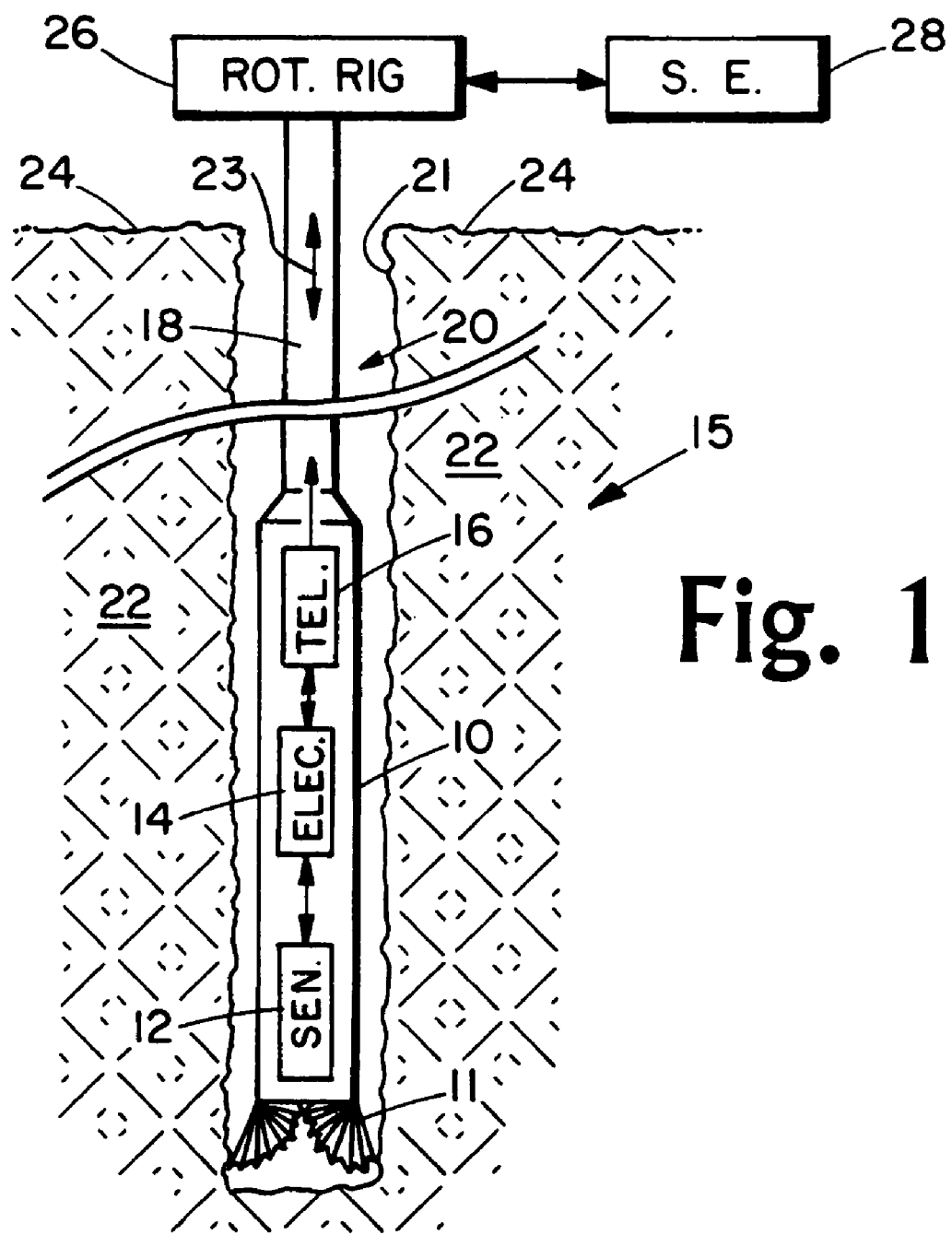
FIG. 1 illustrates the spectral natural gamma ray LWD system displayed as a whole.

FIG. 1 illustrates the LWD system 15 displayed as a whole. A downhole assembly or "tool" comprises a drill collar 10 that is attached to the lower end of a drill string 18. A drill bit 11 terminates the lower end of the collar 10. Within the collar 10 are disposed a sensor element 12, an electronics element 14, and a downhole telemetry 16. The tool is conveyed along a well borehole 20, defined by borehole walls 21 and penetrating formation 22, by means of the drill string 18. The drill string 18 is operated from the surface 24 of the earth by rotary drilling rig, which is only illustrated conceptually at 26 since such rigs are well known in the art.

Information from the tool is telemetered to the surface of the earth 24 via a telemetry link (illustrated conceptually by the arrow 23) and received by a surface telemetry element (not shown) contained in surface equipment 28 that is operationally connected to the drilling rig 26. Information can also be transmitted from the surface equipment 28 to the tool via the telemetry link 23.

Figure 2:
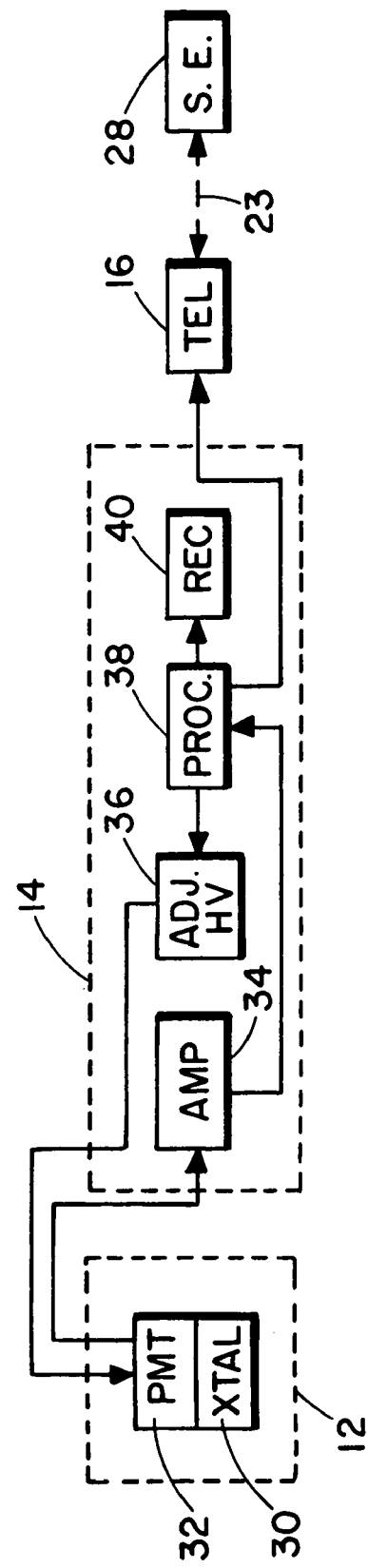
FIG. 2 is a functional diagram of major elements and components of the spectral LWD system.

More details of the sensor element 12, the electronics element 14. and the downhole telemetry element 16 and their operating relationships are shown in the functional diagram of FIG. 2. The sensor element 12, illustrated conceptually as a broken line box, comprises at least one gamma ray detector comprising a scintillation crystal 30 and an optically coupled photomultiplier tube 32. Output signals from the photomultiplier tube are input to the electronics element, whose components are enclosed by the broken line box designated as 14. The signals are amplified using appropriate preamplification and amplification circuits 34. Amplified sensor signals are input to a processor 38. Voltage for the photomultiplier tube 32 is provided by an adjustable high voltage power supply 36 within the electronics element 14.

Still referring to FIG. 2, the processor 38 provides means for automatically controlling the gain of the at least one gamma ray detector, and is also used to process signals from the gamma ray detector to obtain elemental concentrations of K, U and Th. As mentioned previously, the tool is preferably calibrated at the surface to a "standard" gain. While logging, the temperature of the tool and elements therein change. Changes in temperature or, to a lesser extent, changes in measured gamma ray count rate result in detector gain change. Gain changes are reflected in the energy spectrum of the measured detector signals. Measured features of the spectrum are used to correct for these gain changes, as will be discussed in detail in subsequent sections of this disclosure. A gain correction signal representative of the magnitude of the gain change is generated by the processor 38 and input to the adjustable high voltage power supply 36 thereby adjusting detector high voltage so that the gain is restored to the "standard" gain. Elemental concentrations of K, U and Th are determined from gain corrected detector spectra in the processor 38 using predetermined relations as will be discussed subsequently. Elemental concentrations of K, U and Th are input to the downhole telemetry element 16 and telemetered, via the telemetry link 23, to the surface telemetry element contained in surface equipment 28.

FIGS. 3a and 3b are cross sectional and side sectional views, respectively, of the collar 10 in the region of the sensor element and depict a sensor element comprising one gamma ray detector. FIG. 3a shows the cross section A-A' of the collar 10 with the axis of a drilling flow conduit 44 displaced from the axis of the collar. A detector channel on the periphery of the collar 10 and defined by the surfaces 40 receives the gamma ray detector comprising a scintillation crystal 30 such as NaI, CsI, BGO and the like. The scintillation crystal 30 is encapsulates in a hermetically sealed, light reflecting casing 42. The volume 46 is preferably filled with a material such RTV, epoxy and the like. The collar 10 is surrounded by a thin sleeve 48 in the region of the sensor element 12. FIG. 3b shows the side section B-B' which includes the major axis of the collar 10. A photomultiplier tube 32 is optically coupled to the scintillation crystal 30. Electrical leads to the photomultiplier tube are not shown for purposes of clarity.

Again referring to both FIGS. 3a and 3b, it is apparent that the scintillation crystal 30 is disposed as close as practical to the periphery of the collar 10. This minimizes intervening material between the detector and the source of gamma radiation, which is earth formation penetrated by the borehole (not shown). By displacing the axis of the flow conduit 44, the diameter, and thus the efficiency, of the detector is maximized. For typical LWD equipment, the diameter of the scintillation crystal can be 2 inches (5.1 centimeters) or larger and still maintain structural specifications of the collar 10. As a result of this detector geometry, gamma ray spectral degradation is minimized and measured count rate is maximized for a given detector size.

Figure 4:
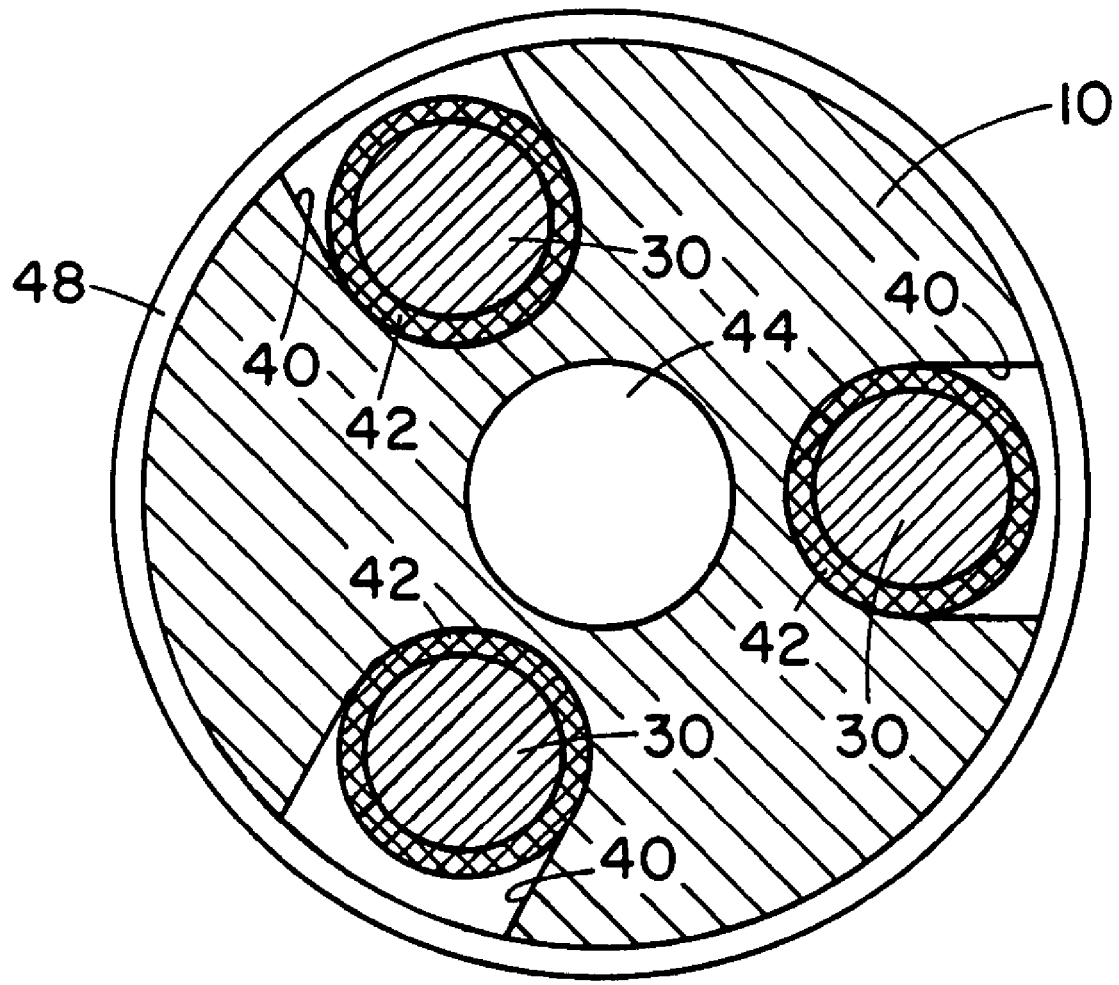
FIG. 4 is a cross sectional view of a spectral LWD tool sensor element comprising three gamma ray detectors.

FIG. 4 illustrates a sensor element comprising three gamma ray detectors. This cross section view shows the scintillation crystals 30 of each detector. Each crystal 30 is encapsulated in hermetically sealed, light reflecting casing 42, and is disposed in a detector channel defined by the surfaces 40. The channels are arranged at 120 degree angular spacings. The collar 10 is in the region of the sensor element and is again surrounded by a thin sleeve 48. A side section view has been omitted for brevity, but a photomultiplier tube (not shown) is again optically coupled to each scintillation crystal 30. As with the single detector sensor element shown in FIGS. 3a and 3b, it is apparent that the scintillation crystals 30 are disposed as close as practical to the periphery of the tool thereby minimizing intervening material between the detectors and the source of gamma radiation within the earth formation. Using the multiple detector configuration, the axis of the flow conduit 44 is coincident with the axis of the collar 10. For typical LWD equipment, the diameter of each scintillation crystal is limited to about 1.5 inches (3.8 centimeters) so that structural specifications of the collar can be maintained. Compared with the single scintillation crystal sensor element configuration shown in FIGS. 3a and 3b, the efficiency of each detector on FIG. 4 is reduced. Signals from each detector can, however, be combined to obtain a total sensor element efficiency that equals or exceeds the efficiency of the single detector configuration. In addition, the three detector sensor element configuration offers advantages in azimuthal spectral gamma ray measurements that will be discussed in a subsequent section of this disclosure.

It should be understood that the multiple detector sensor element configuration is not limited to the three detector configuration shown in FIG. 4. It should also be understood that angular spacing between the multiple detectors need not be equal. Finally, it should be understood that the dimensions of the multiple detectors need not be the same.

Gain Stabilization

Two methods of detector gain stabilization are disclosed. The first method will be referred to as the "measured spectral analysis" method, and the second method will be referred to as the "detector source" gain correction method. The gain of an LWD gamma ray detector can change significantly and rapidly in the harsh borehole drilling environment. Telemetry links between the tool and the surface are relatively slow and do not permit gain monitoring and correction from the surface. Gain control must be implemented automatically within the tool. Both of the disclosed methods can be used to effectively control gamma ray detector gain.

Considering the importance of gain control and the harshness of the borehole environment, it is desirable to use both methods. The two methods can be used with one serving as a primary method for gain control, and the second serving as a back-up method for gain control. Alternately, both methods can be used simultaneously, and the results combined to obtain a detector gain correction. Such a combination can take a variety of forms including a simple numerical average or a weighted average.

Measured Spectral Analysis Method

Figure 5:
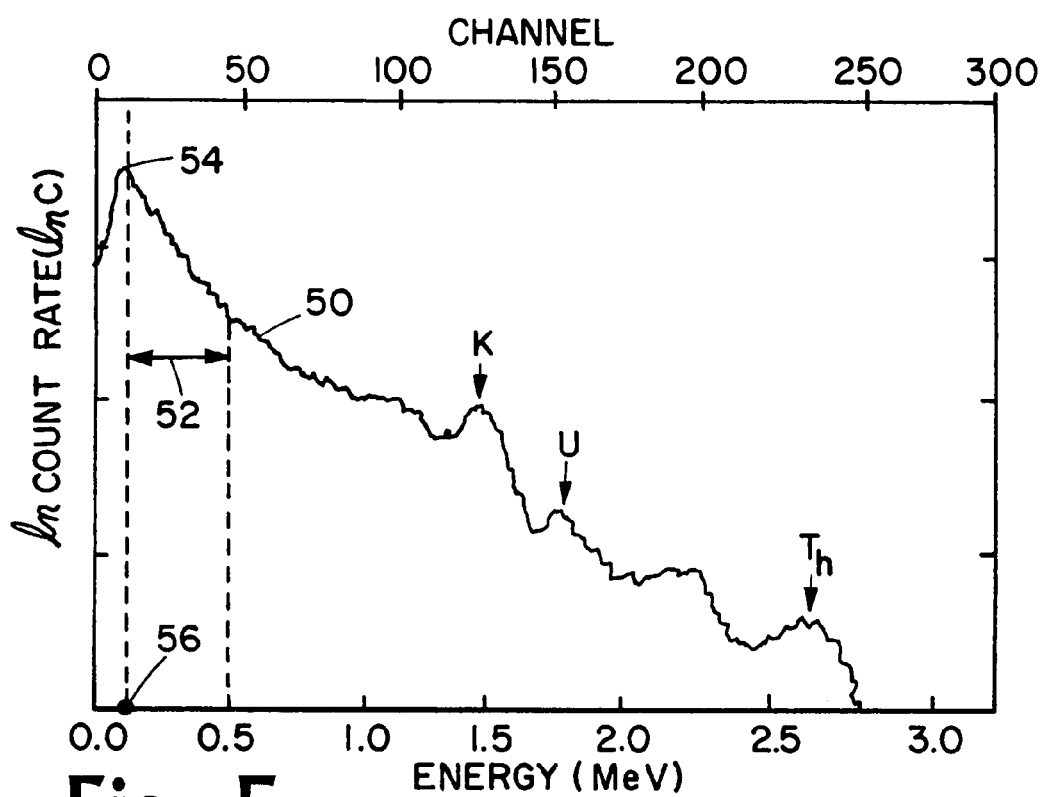
FIG. 5 is a typical gamma ray natural gamma ray spectrum measured with the spectral gamma ray LWD tool.

FIG. 5 is a typically natural gamma ray spectrum measured in earth formation with a scintillation type gamma ray detector. The spectrum comprises measured gamma ray intensity as a function of gamma ray energy, represented by the curve 50. The abscissa is gamma ray energy in million electron Volt (MeV), and the ordinate in the natural log of measured count rate per increment of energy. The increments of energy are represented energy channels or "channels" on the top scale abscissa. Representative peak structure from K, U and Th is shown at energies 1.46 MeV, 1.76 MeV and 2.61 MeV, respectively. During tool calibration, the detector high voltage is adjusted to give a detector gain for which specific energies of gamma radiation fall within predetermined energy channels. This gain is referred to as the "standard" gain. Tool calibration will be discussed further in a subsequent section of this disclosure.

The Compton scatter region of the spectrum comprises formation gamma radiation that has undergone several collisions in intervening material before it reaches the gamma ray detector. This region of the spectrum is identified by the numeral 52, and terminates at the low energy region by the "hump" 54 at energy 56. This exponential-looking region 52 contains no direct contributions from K, U, and Th gamma radiation. The slope of this region is mainly a function of the photomultiplier tube gain, and can be used to monitor detector gain.

Figure 6:
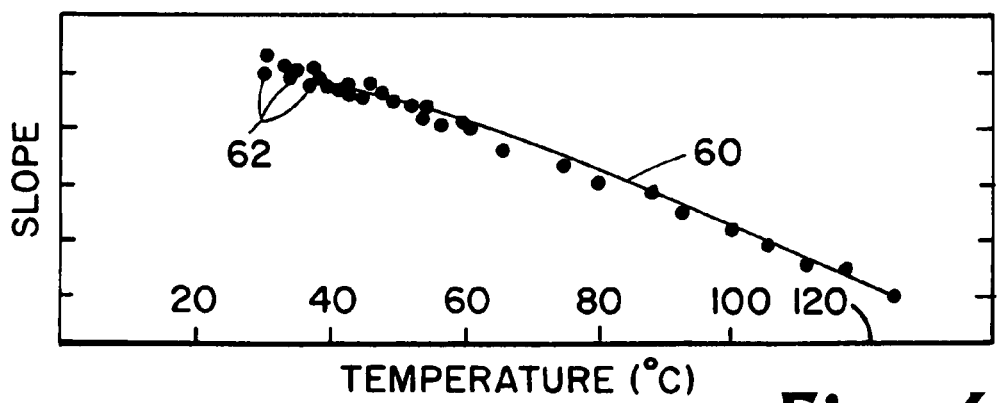
FIG. 6 shows a relationship between the slope of the Compton region of the measured gamma ray spectrum and the temperature of the gamma ray detector.

FIG. 6 is a plot of the measures of the slope of the Compton region 52 as a function of detector temperature in degrees Centigrade (° C.). Measured values of slope (ordinate) versus temperature (abscissa) are indicated by the data points 62. A curve 60 fitted through the data points 62 shows that there is essentially 1:1 correlation between the slope and detector temperature.

Figure 7:
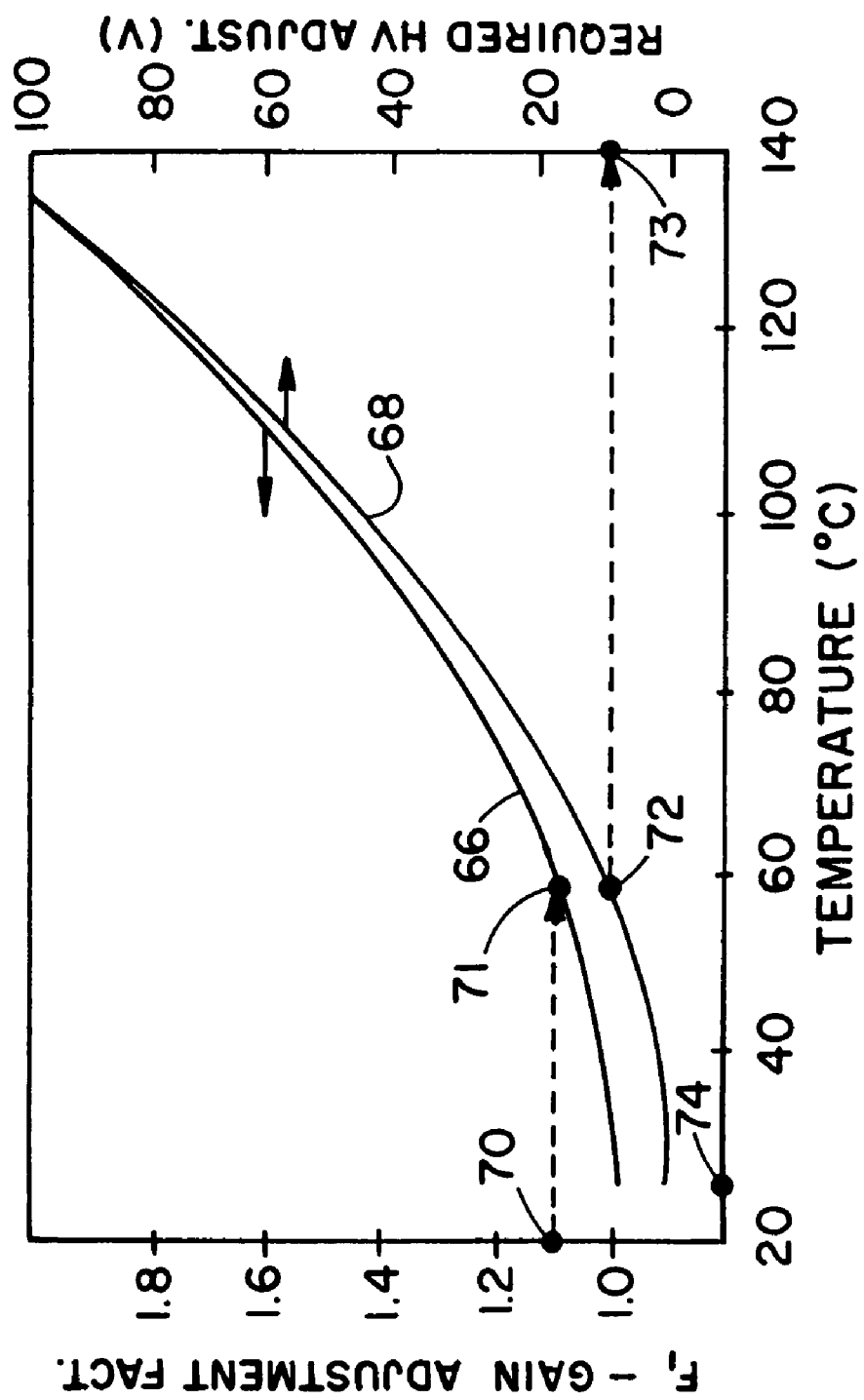
FIG. 7 illustrates relationships between detector gain adjustment factor required to obtain standard detector gain, a required high voltage adjustment to obtain standard detector gain, and detector temperature.

Curve 66 of FIG. 7 shows the relationship between a multiplicative first order gain adjustment factor $F_1$ and corresponding detector temperature, where $$G_{std} = F_1 G_{obs}. \quad (1)$$

$G_{obs}$ is the observed detector gain, and $G_{std}$ is the previously defined "standard" gain for which the tool is calibrated. Relationships of slope versus temperature shown graphically as curve 60 on FIG. 6 can be combined with gain adjustment factor as a function of temperature shown graphically as curve 66 in FIG. 7 to eliminate the temperature parameter. This combination yields a functional relationship between the measured slope and the desired first order gain adjustment factor $F_1$.

At this point, detector high voltage can be adjusted to correct detector gain for temperature effects. Curve 68 of FIG. 7 shows the relationship between required high voltage adjustment to obtain $G_{std}$ and detector temperature. Once $F_1$ has been obtained as described above, the high voltage $V_1$ required to obtain $G_{std}$ can then be determined. The following example is presented as a graphical solution. Assume that from a measure of the Compton slope, it has been determined that $F_1 = 1.1$ as indicated in FIG. 7 at 70. A horizontal line is projected until it intersects the curve 66 at a point 71. A vertical line is projected until it intersects the curve 68 at point 72. Finally, a horizontal line is projected to the right ordinate at point 73 giving a required high voltage correction of +10 volts. Referring again to FIG. 2, 10 volts added to the photomultiplier tube 32 by the adjustable high voltage power supply will adjust the gain of the gamma ray detector to the standard gain $G_{std}$.

To summarize, the relationships shown graphically in FIG. 6 and FIG. 7 are combined to develop a relationship between measured slope in the Compton region as a function of high voltage required to maintain standard detector gain. The example discussed above is graphical, but it should be understood that the solution can be reduced to analytical form suitable for computation in a processor. A measure of slope can, therefore, be used to correct for detector gain shifts. Using this slope to predict gain changes is extremely robust since it is calculated from a number of data points, it is immune to electronics noise, and it has been found that is not highly affected by borehole and formation conditions. A first order detector gain correction can be made for the most severe gain changes ranging from about −60% of the standard gain to +150% of the standard gain. Such severe gain changes are induced by equally severe changes in temperature ranging from about −60° C. to about +150° C., with 25° C. being the "standard" calibration temperature.

Figure 8:
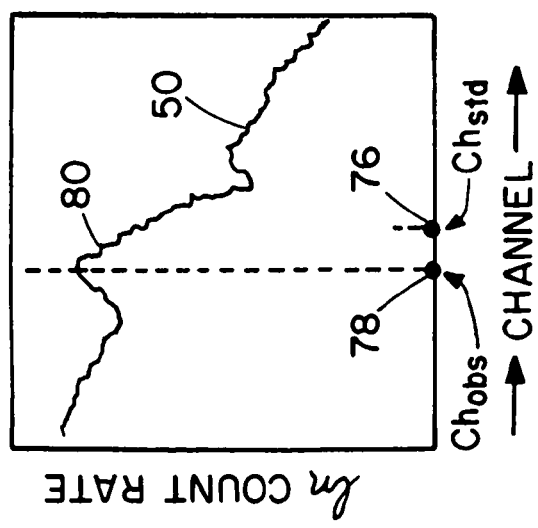
FIG. 8 is a more detailed view of a measured gamma ray spectrum illustrating how a spectral peak position is used to obtain a second order detector gain adjustment.

As discussed above, a measure of slope can be used to obtain a voltage adjustment required to obtain standard gain. This is a first order correction considering the magnitude of gain changes that can be handled. Second and third order corrections are made to further increase precision and accuracy of the detector gain settings. Because of these additional corrections, it is preferred not to adjust detector voltage after the first order gain correction. Instead, the spectrum is adjusted by adjusting the count rate per energy channel using the first order gain correction factor $F_1$. Using the previous example of $F_1=1.1$, the width of each channel is "stretched" by 10 percent, and the measured count rates are redistributed over the wider channels. This methodology can be thought of a "software" gain shift, and is preferably performed in processor 38. The detector gain adjustment is now further refined by examining a predominate peak in this modified energy spectrum. FIG. 8 shows a portion of the full spectrum 50 shown in FIG. 5, and includes a peak 80 at 1.46 MeV from K. This peak is typically the most prominent peak in the spectrum, and is suitable for the second order gain adjustment. After modifying the spectrum using methodology previously discussed, it is observed that the maxima of the peak 80 falls in a channel $Ch_{obs}$ at 78. Tool calibration requires that the energy corresponding to this peak maxima fall in a modified channel $Ch_{std}$ at 76, where the channels have been adjusted in width by the first order correction $F_1$. The gain of the detector is further adjusted to a second order correction so that the maxima of the peak 80 falls in $Ch_{std}$. This is again accomplished with a "software" gain shift by adjusting the widths of the energy channels and redistributing the measured count rates to form a second modified spectrum. A second order gain correction $F_2$ is obtained from the equation $$F_2=(Ch_{std}/Ch_{obs}). \tag{2a}$$

The gain correction process can be terminated at this point, with no further refinement of the gain setting. If this option is chosen, the corresponding high voltage setting $V_2$ required to obtain this second order corrected standard gain and is expressed mathematically as $$V_2=F_2V_1 \tag{2b}$$

Figure 9:
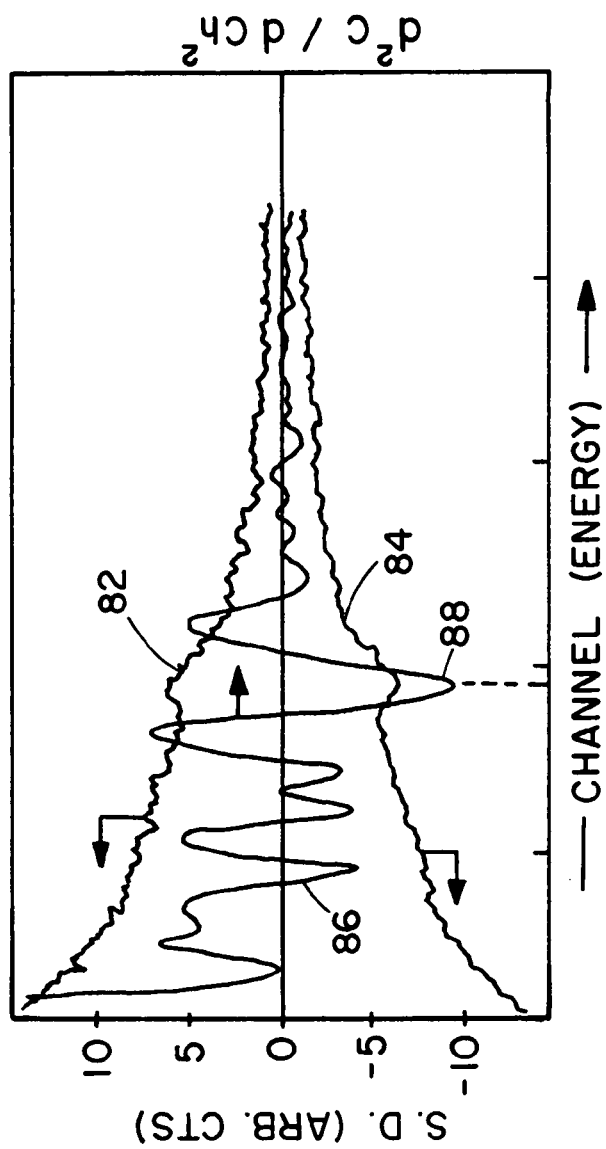
FIG. 9 is a graphical illustration of a method for locating statistically significant peak structure in a measured gamma ray spectrum.

Peaks in measured gamma ray spectra such as the curve 50 shown in FIG. 5 are identified with respect to channel (and corresponding energy) using a second derivative algorithm after a strong filter is applied. Locations of the peaks are determined using a Guassian fit around each peak. FIG. 9 illustrates the effectiveness of the detection and location method. Curve 86 represents the second derivative $d^2C/dCh^2$ (right ordinate) of spectral count rate C as a function of corresponding energy channel Ch for a spectrum of the type shown in FIG. 5. Peaks are indicated when the curve 86 crosses $d\ 2C/dCh^2=0$. Since the spectrum exhibits statistical variations, the curve can also exhibit a "zero crossing" due to statistics of the count rate rather than actual peak structure. It is, therefore, necessary to identify a non-statistical or "noise" zero crossings from a true zero crossing which indicate a peak. The curves 82 and 84 represent upper and lower limits of standard deviation of the count rate C as a function of energy channel, and are presented in arbitrary count rate units of the left ordinate. Only zero crossing excursions that extend outside the standard deviation "envelope" are considered as statistically significant indications of a peak. There is only one such indication in the curve 86 at a channel identified by the numeral 88. This corresponds to the K peak at 1.46 MeV shown clearly in FIG. 5.

It is preferred to still further refine the gain setting. Once the second modified energy spectrum has been computed, all statistically significant peaks in the second modified spectrum are located using the peak location technique discussed above. Once the energy channels in which these peaks are observed, they are compared with their corresponding "standard" channels determined in tool calibration. This methodology is similar to the single-peak methodology used for the second order gain correction, but all peaks are used in this third order correction. Channel widths are again adjusted and count rates redistributed so that all identifiable peaks fall in their corresponding standard energy channels, corrected for the first and second order software gain adjustments. This is the third order gain correction and yields a third order gain adjustment factor $F_3$. The uncorrected detector voltage V is now adjusted to obtain a corrected voltage $V_{cor}$ using the relationship $$V_{cor}=F_1F_2F_3V. \tag{3a}$$

The corrected detector gain $G_{cor}$ is $$G_{cor}=H\ V_{cor} \tag{3b}$$

where H is a multiplicative constant relating the third order corrected high voltage $V_{cor}$ to the fully corrected detector gain $G_{cor}$. Channel widths are reset to their original values.

Figure 10:
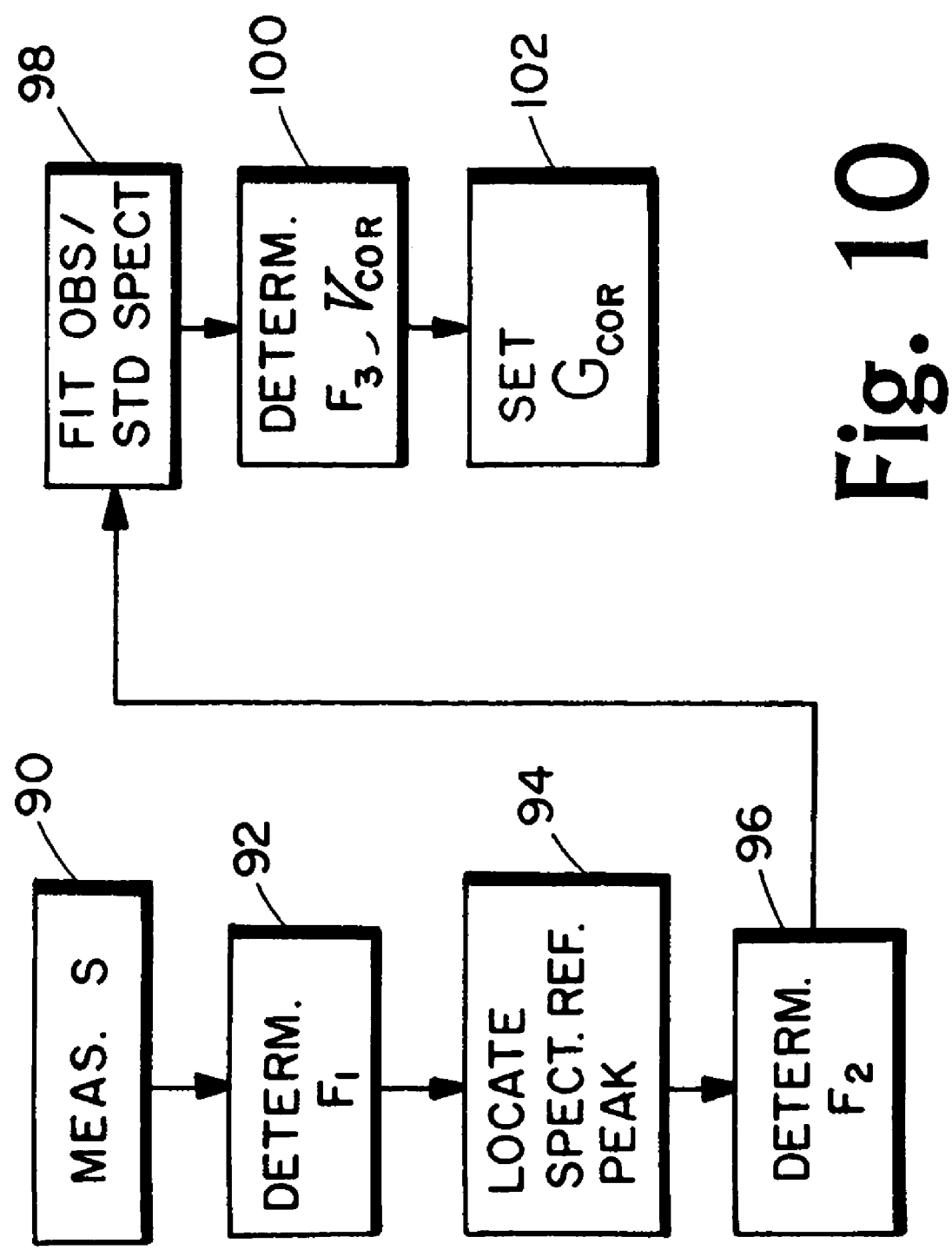
FIG. 10 is a flow chart showing steps for automatically controlling the gain of a gamma ray detector using a measured spectral analysis method.

The measured spectral analysis method of automatic gain correction is summarized in the flow chart shown in FIG. 10. The slope of the Compton region 52 (see FIG. 5) is measured at 90. The first order gain correction $F_1$ is determined at 92 using the measured slope as discussed above. An identifiable peak is located in the measured spectrum at 94. The second order gain correction $F_2$ is determined at 96 using previously discussed methodology and equation (2a). All statistically significant peaks in the measured gamma ray spectrum are determined at 98. The third order gain correction factor $F_3$ is obtained at 100 by a software gain adjustment that positions all peaks in alignment with their assigned energy channels obtained at tool calibration. The corresponding high voltage $V_{cor}$ required for standard detector gain is also determined at 100 using equation (3a). The corrected detector gain $G_{cor}$ is set at 102 using $V_3$ and equation (3b). It again noted that an actual voltage adjustment is made only after the third order correction, with software gain adjustments being used in the first and second order corrections. It should also be understood that other algorithms can be used to obtain suitable software gain adjustments for the first and second order corrections.

Detector Source Gain Correction Method

Gamma ray detector gain can be monitored using an alternate technique. A small radioactive "detector" source is disposed near or within the one or more scintillation crystals comprising the natural gamma ray LWD sensor element. The detector source generates a "calibration" peak in the measured gamma ray spectrum. If the gain of the measured spectrum changes, the position of the calibration peak shifts with the change in gain. A measure of position of the calibration peak can, therefore, be used to monitor and to correct detector gain.

The calibration peak is preferably at a relatively low energy so that it will not interfere with higher energy radiation from K, U and Th used to determine elemental concentrations. A suitable detector source is Americium-241 ($^{241}$Am) which emits gamma radiation at 0.060 MeV. Referring again to FIG. 5, a typical measured natural gamma ray spectrum encompasses an energy range of 0.0 to 3.0 MeV over typically 256 channels. With this "standard" detector gain setting, the low energy end of the spectrum, which includes the 0.060 MeV calibration peak, is very susceptible to electronics noise. In addition, since the spectrum spreads over about 3.0 MeV and typically 256 energy channels, the $^{241}$Am peak occupies only about 3 out the 256 channels, which makes it difficult to precisely locate the peak position.

Figure 11:
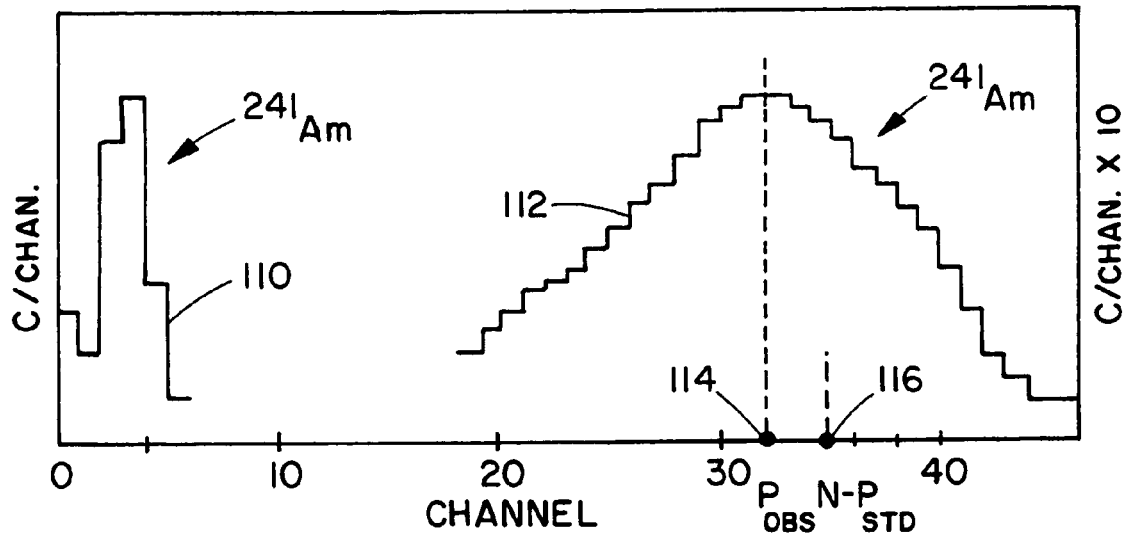
FIG. 11 illustrates basic concepts used for automatically controlling the gain of a gamma ray detector using a detector source gain control method.

Attention is directed to FIG. 11, which conceptually depicts the low energy region of a gamma ray spectrum measured with a detector comprising a $^{241}$Am detector source. The curve 110 shows the peak structure with the detector set at standard gain. Since the peak occupies only three energy channels, it is difficult to locate the center of the peak using previously discussed methods. This peak can, in principle, be used as shown to stabilize detector gain. Any gain stabilization using the $^{241}$Am peak at 0.060 MeV would, therefore, be subject to large errors, especially at the higher energy region of the spectrum used for elemental concentration calculations.

The precision of detector gain stabilization using a low energy detector source and calibration peak is improved using dual gain circuitry. The spectrum signal from the gamma ray detector is "branched" and input into first and second amplification circuits comprising the dual gain circuitry. The first circuit comprises a standard amplification circuit and generates a spectrum with standard gain. The 0.060 MeV $^{241}$Am peak in this standard spectrum is shown at 110 in FIG. 11. For purposes of gain stabilization, the spectrum signal is input to a second amplification circuit with a gain factor of N greater than that of the standard gain. The second amplification circuit generates an amplified spectrum with an "amplified" gain. For purposes of discussion, it will be assumed that N=10, although it should be understood that other values of N can be used. Curve 112 is the amplified gain spectrum showing the $^{241}$Am peak at 0.060 MeV amplified by a factor of N=10. The peak now occupies about 30 energy channels, and previously discussed peak location methods are used to determine that the center of the peak is in energy channel $P_{obs}$, which identified at 114. From tool calibration, it is known that energy 0.060 MeV should fall in energy channel $P_{std}$ for the standard gain, or in channel N×$P_{std}$ for the amplified gain, shown at 116 in FIG. 11. The detector high voltage V is adjusted to a corrected value, $V_{cor}$, using the relationship $$V_{cor} = V(N P_{std}/P_{obs}). \quad (4)$$

A signal proportional to (N $P_{std}/P_{obs}$) is preferably generated in the processor 38 and input to the adjustable high voltage power supply 36. This generates the corrected high voltage $V_{cor}$ supplied to the detector. Corrected standard gain amplification $G_{cor}$ is expressed by the relationship $$G_{cor} = H V_{cor} \quad (5)$$

where H, as in equation (3), is a multiplicative constant relating high voltage to detector gain.

It should be understood that various methods can be used to increase the detector gain by a factor of N. As an example, the amplification circuit 34 (see FIG. 2) can contain a high gain element which, under the control of the processor 38, "branches" detector input. The gain of one branch of the input by a factor on N thereby forming the amplified gain of the calibration peak for purposes of calibration source gain stabilization.

Figure 12:
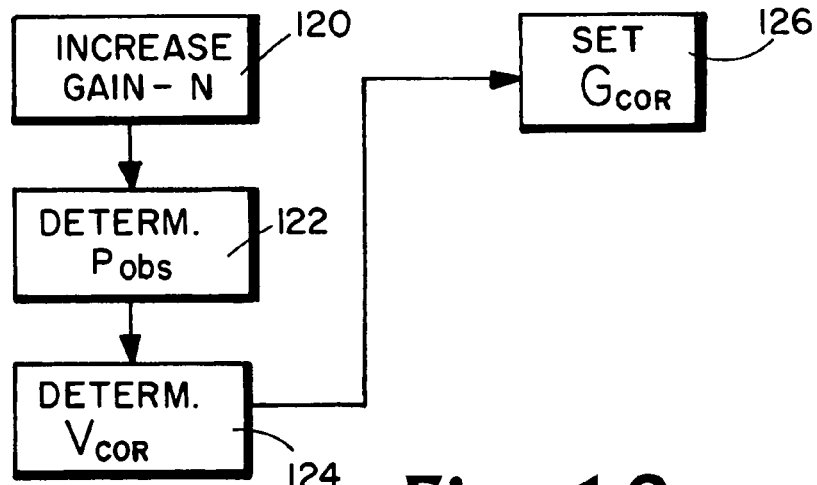
FIG. 12 is a flow chart showing steps for automatically controlling the gain of a gamma ray detector using the detector source gain control method.

The gain stabilization method using a radioactive "detector" source is summarized in the flow chart of FIG. 12. The low energy portion of the measured gamma ray spectrum is increased by a factor of N at 120. The energy channel $P_{obs}$, in which the stabilization peak is maximum, is determined at 122 using a suitable peak location technique. High voltage $V_{cor}$ required to position the peak maxima in energy channel N×$P_{std}$ is determined (see equation (4)) at 124, and the correct detector gain $G_{cor}$ is set at 126 (see equation (5)).

Hybrid Correction Method

The measured spectral analysis method and the detector source gain correction methods can be combined to yield a hybrid gain control method. A calibration source is disposed in within or in the immediate vicinity of at least one gamma ray detector. When in the borehole, this detector produces a gamma ray spectrum comprising a first component from naturally occurring radioactive elements within the formation and a second component from the calibration source. A first detector gain correction is determined from spectral features from the naturally occurring gamma radiation as previously discussed in the measured spectral analysis method. A second gain correction is determined from the calibration source component as previously discussed in the detector source gain correction method. The first and second gain corrections are combined to correct for gain shift of the detector.

Elemental Concentration Determinations

With detector gain stabilized to "standard" gain, elemental concentrations of K, U and Th are determined, preferably in the processor 38 of the electronics element 14 (see FIGS. 1 and 2), from measured spectral data. These elemental concentrations can be input to the downhole telemetry element 16 and telemetered via the telemetry link 23 to the surface equipment 28. Alternately, the spectral data can be input to the downhole telemetry element 16 and telemetered to the surface equipment 28 for subsequent processing. Since the telemetry bandwidth is limited and the gamma ray spectra are much more data intensive than the elemental concentrations determined therefrom, it is preferred to telemeter the elemental concentrations of K, U and Th to the surface. Alternately, spectral gamma ray data and elemental concentration determinations can be recorded by a data storage means within the electronics element, and subsequently extracted from processing and analysis when the tool is returned to the surface.

The following methodology is preferred for determining elemental concentrations of K, U and Th. It should be understood, however, that other spectral processing methods such as spectrum stripping, peak area analysis and the like can be used to determine concentrations of K, U and Th. The required elemental concentration calibration constants are obtained at tool calibration.

Elemental concentrations are obtained by solving the matrix equation $$[C] = [A][M] \quad (6)$$

[C] is a m×1 column matrix comprising elements $c_i$ (i=1, . . . , m) representing count rate recorded in energy channel i (see FIG. 5). Typically 256 energy channels (m=256) are used, although more or fewer channels can be used within the scope of the invention.

[A] is a m×j matrix comprising elements $a_{ij}$ with (i=1, . . . , m) and (j=K, U, Th). Physically, the element $a_{ij}$ is the sensitivity of energy channel i to the element j, typically in units of counts per second per part per million (U and Th) or counts per second per percent (K). The matrix [A] comprises calibration constants, is referred to as a "sensitivity" matrix, and is determined at tool calibration. At tool calibration, the response of the tool is measured in formations containing known concentrations of K, U and Th, and in "standard" borehole conditions, and with the one or more detectors in the sensor element operated at "standard" gain $G_{cor}$.

[M] is a j×1 column matrix comprising elements Mj (j=K, U, Th) which are the parameters of interest, namely the formation elemental concentrations of K, U and Th. $M_K$ is in percent, and $M_U$ and $M_{Th}$ in parts per million (ppm). The desired elemental concentrations are obtained by solving equation (6) for [M], preferably using a weighted least squares fit.

Measured gamma ray spectra from one or more gamma ray detectors in the sensor section are tracked as a function of depth of the tool in the borehole 20 (see FIG. 1). If the sensor element 12 comprises only one gamma ray detector as shown in FIGS. 3a and 3b, the elements of the matrix [C] are obtained from that detector. If the sensor element comprised a plurality q of detectors, such as the q=3 embodiment shown in FIG. 4, the elements of the [C] matrix are obtained by combining responses of the q detectors, typically by simply summing the responses if all detectors exhibit equal sensitivity.

AZIMUTHAL ELEMENTAL CONCENTRATION DETERMINATIONS

Figure 13:
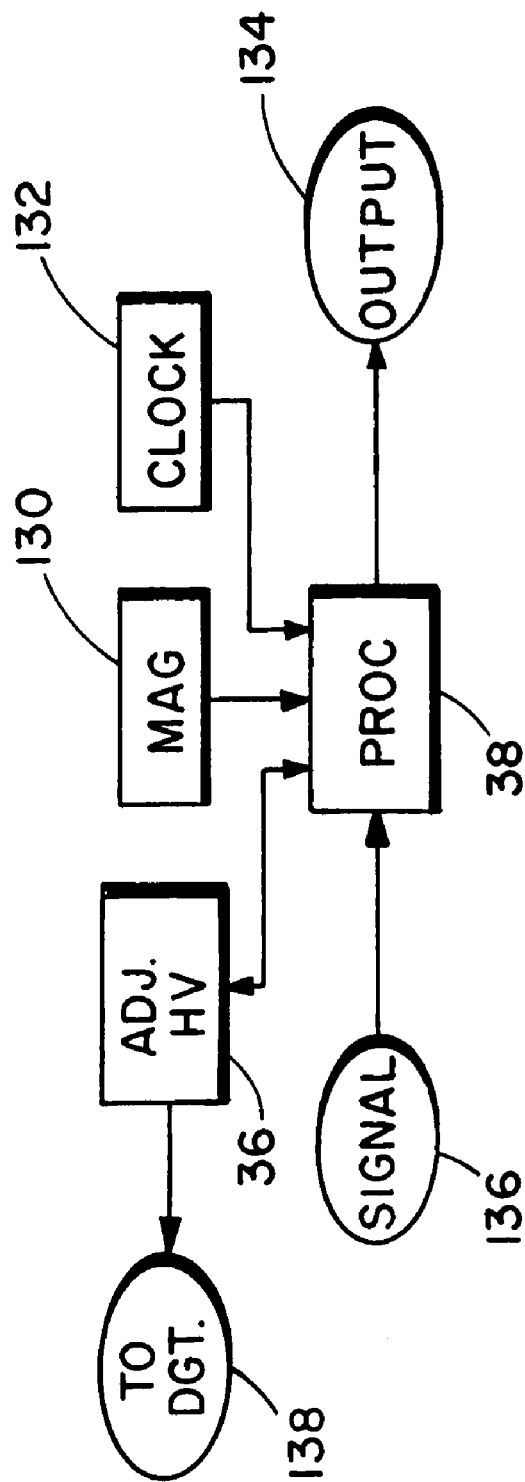
FIG. 13 shows additional hardware components needed to obtain azimuthal natural gamma ray measurements using the LWD system.

The spectral gamma ray LWD system can be used to measure elemental concentrations $M_K$, $M_U$ and $M_{Th}$ as a function of azimuth within the borehole as well as a function of depth within the borehole. Azimuthal measurements require additional components disposed preferably within the electronics element 14. FIG. 13 is a functional diagram of components added to the electronics element shown in FIG. 2 so that azimuthal elemental concentrations $M_K$, $M_U$ and $M_{Th}$ can be determined. A device sensing tool orientation, such as a magnetometer 130, and a clock 132 are operationally connected to the processor 38. As in the previous discussion of FIG. 2, signals from the one or more gamma ray detectors and amplifier circuits are input to the processor at 136. The processor 38 again controls detector gain adjustments of the detectors at 138 through the adjustable high voltage power supply 36. Spectral and elemental concentrations are output from the processor at 134 as described below.

As the tool rotates through 360 degrees, gamma ray spectra of the form shown in FIG. 5 are measured during discrete time intervals Δt, where these elements are defined by the clock 132 cooperating with the processor 38. Spectra are stored in bins according to time intervals Δt in which they are measured. The time interval Δt is preferably about 50 milliseconds. During each time interval, the average reading of the magnetometer 130 is determined thereby defining an azimuth sector associated with each time interval, and thereby assigned an azimuth sector to each bin. Each bin, therefore, contains a gamma ray spectrum measured at a known borehole azimuth sector. The spectral data binning, and the averaging of magnetometer readings during each time interval, are controlled by the processor 38. Binned spectral data and corresponding azimuth sectors are preferably stored in the processor 38. The process is repeated through multiple 360 degree rotations within a given depth interval Δd in order to maximize statistical precision of each natural gamma ray spectrum stored in each bin. Gain stabilization techniques previously disclosed in detail are used to control the gain of each binned spectrum. Previously discussed data analysis methods are used to compute the matrix [M] for each binned spectrum thereby yielding elemental concentrations $M_K$, $M_U$ and $M_{Th}$ for each azimuth sector around the borehole.

If the sensor element comprises a plurality of detectors, detector outputs are phased by the processor 38 so that as each detector rotates through each azimuth sector, output from that detector is stored within the bin corresponding to that azimuth sector.

The tool can be conveyed along the borehole without rotating. This conveyance is commonly referred to as "sliding". If the sensor element 12 comprises only one gamma ray detector, azimuthal natural gamma ray spectral measurements can not be made when the tool is sliding. If the sensor element comprises a plurality of gamma ray detectors, azimuthal spectral measurements can be obtained while sliding. The magnitudes of the azimuth sectors are determined by the number of detectors in the sensor element. For the sensor element comprising three detectors on 120 degree centers as shown in FIG. 4, each azimuth sector would be 120 degrees. This yields an azimuthal resolution that is typically inferior to that obtained with the tool rotating and with time intervals Δt of about 50 milliseconds.

Log Presentations

Figure 14:
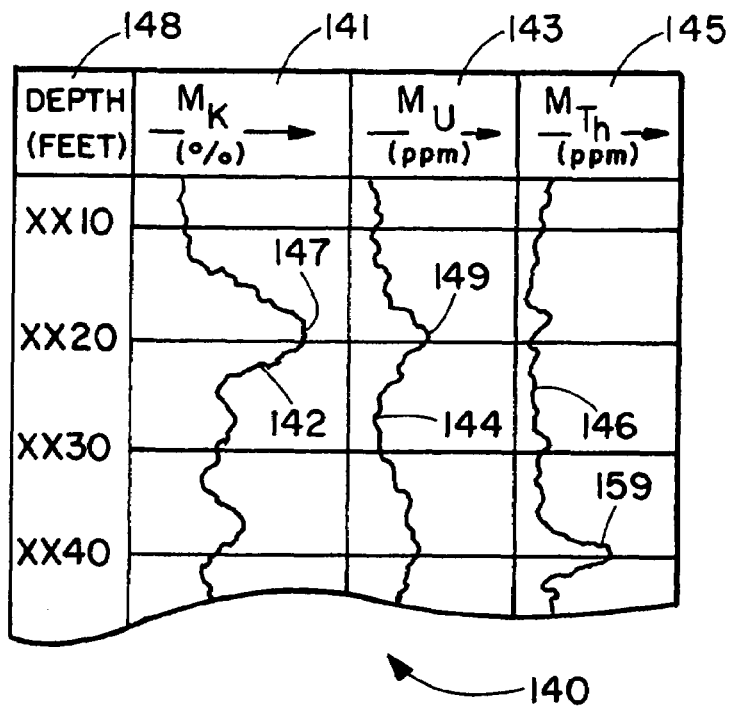
FIG. 14 is an example of a spectral gamma ray LWD log showing concentrations of K, U and Th as a function of depth within a borehole.

FIG. 14 shows an example 140 of a natural gamma ray LWD log presentation of $M_K$, $M_U$ and $M_{Th}$ as a function of depth in the borehole. The quantities $M_K$, $M_U$ and $M_{Th}$ are computed from measured spectral data [C] using equation (6). Units for concentrations of K (%), U (ppm) and Th (ppm) are shown in the fields 141, 143 and 145, respectively. Scales are typically in % per chart division for K and ppm per chart division for U and Th. Concentrations of $M_K$, $M_U$ and $M_{Th}$ are shown as a function of depth 148 in the borehole by curves 142, 144 and 146, respectively. As an example, excursions 147 and 149 in $M_K$ and $M_U$, respectively, are indicated at a depth of about xx20. An excursion 159 in $M_{Th}$ is indicated at a depth of about xx40. It should be understood that other formats can be used to present the basic LWD natural gamma ray log data.

Figure 15:
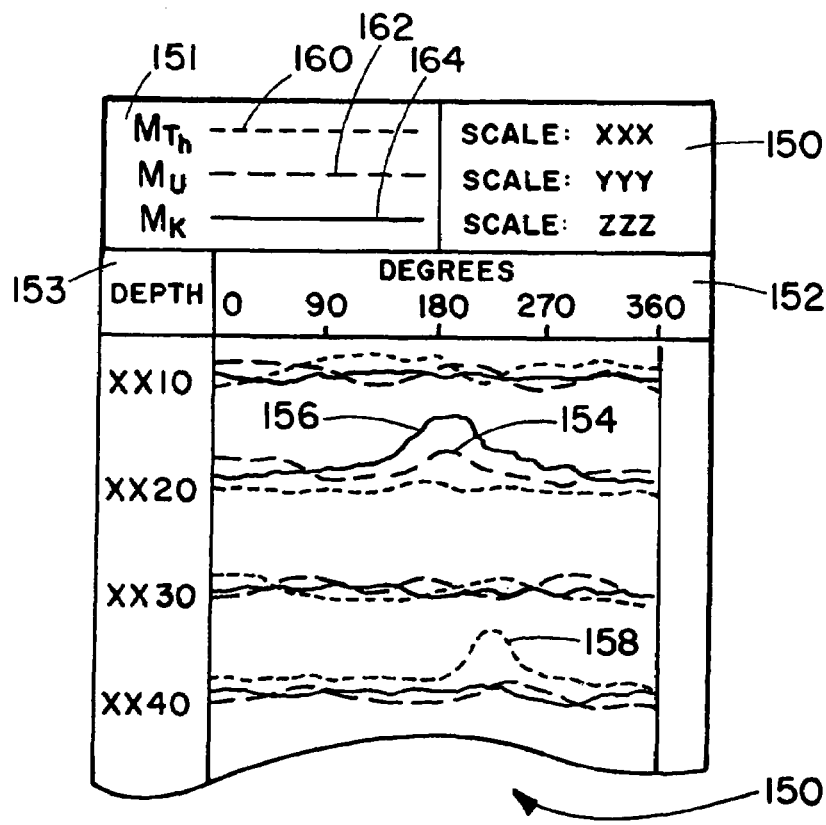
FIG. 15 is an example of an azimuthal spectral gamma ray LWD log showing concentrations of K, U and Th as a function of azimuth around the borehole and as a function of depth within the borehole.

FIG. 15 shows an example 150 of an azimuthal natural gamma ray LWD log presentation. Elemental concentrations of $M_K$ (%), $M_U$ (ppm) and $M_{Th}$ (ppm) are designated with solid, long dashed and short dashed curves 164, 162, and 160, respectively, as shown in field 151. Corresponding scales for these concentrations are tabulated in field 150 and are typically in % per chart division for $M_K$ and ppm per chart division for $M_U$ and $M_{Th}$. Concentrations $M_K$, $M_U$ and $M_{Th}$, obtained from spectra summed over a depth interval Δd shown in the field 153, are shown as a function of azimuth sector 152, in degrees, for that depth interval. As an example, excursions 156 and 154 in $M_K$ and $M_U$, respectively, are shown at an azimuth sector of about 180 degrees over the depth interval xx20. As another example, an excursion 158 in $M_{Th}$ is shown at an azimuth sector of about 225 degrees over the depth interval xx40. It should be understood that other formats can be used to present the basic LWD azimuthal natural gamma ray log data.

While the foregoing disclosure is directed toward the preferred embodiments of the invention, the scope of the invention is defined by the claims, which follow.

What is claimed is:

1. A gamma ray logging-while-drilling system comprising:
    at least one gamma ray detector that measures a gamma ray energy spectrum;
    wherein said system is configured to make a first adjustment of gain of said detector using a measure of slope of a Compton scatter region of said spectrum.

2. The system of claim 1 wherein said system is configured to:
    (a) measure the location of an energy peak in said spectrum; and (b) make a second adjustment of said gain so that said location corresponds to a standard location for said energy peak.

3. The system of claim 2 wherein said system is configured to:
(a) measure locations of a plurality of energy peaks in said spectrum; and
(b) make a third adjustment of said gain so that each said location of each of said plurality of peaks corresponds to a standard location for that peak.

4. The system of claim 3 further comprising a processor cooperating with said at least one detector, wherein:
(a) said spectrum comprises gamma ray count rate recorded as a function of energy channel within said processor; and
(b) to make said first adjustment, said processor adjusts width of said energy channels as a function of said measure of slope.

5. The system of claim 4 wherein to make said second adjustment, said processor adjusts said width of said energy channels so that said location of said energy peak corresponds to a standard location for said energy peak.

6. The system of claim 5 further comprising an adjustable high voltage power supply cooperating with said processor and said at least one detector, wherein to make said third adjustment, said adjustable high voltage power supply adjusts high voltage supplied to said at least one detector thereby setting said gain of said at least one detector to a standard gain.

7. The system of claim 6 wherein:
(a) said spectrum comprises gamma radiation from at least one naturally occurring radioactive element in formation penetrated by a borehole; and
(b) said processor combines said spectrum with calibration constants using a predetermined relationship to obtain an elemental concentration of said at least one naturally occurring radioactive element.

8. The system of claim 7 wherein said at least one elemental concentration is measured as a function of depth within said borehole.

9. The system of claim 7 wherein said at least one elemental concentration is measured as a function of azimuthal sector around said borehole.

10. The system of claim 7 wherein said naturally occurring radioactive elements comprise potassium, uranium and thorium.

11. The system of claim 1 further comprising a collar, wherein said at least one detector is disposed in a detector channel at the periphery of said collar.

12. The system of claim 1 further comprising a collar, wherein two or more detectors are each disposed within detector channels regularly spaced around the periphery of said collar.

13. A gamma ray logging-while-drilling system comprising:
(a) at least one gamma ray detector that measures a gamma ray energy spectrum;
(b) a calibration source disposed near or within said at least one detector and emitting calibration radiation; and
(c) dual gain circuitry comprising a standard amplification circuit and a high gain circuit;
wherein the system is configured to:
(i) branch and input said spectrum into said dual gain circuitry to produce a standard gain spectrum and an amplified gain spectrum;
(ii) in said amplified gain spectrum, compare the observed position of a calibration peak from said calibration radiation with a predetermined standard position for said calibration peak; and
(iii) correct said standard gain spectrum to a standard detector gain using results of said comparison.

14. The system of claim 13 further comprising:
(a) an adjustable high voltage power supply cooperating with said at least one detector; and
(b) a processor cooperating with said dual gain circuitry and said adjustable high voltage power supply;
wherein
(i) said processor makes said comparison,
(ii) said processor generates a calibration signal indicative of said comparison and inputs said calibration signal to said adjustable high voltage power supply, and
(iii) said adjustable high voltage power supply adjusts high voltage supplied to said at least one detector in relation to said calibration signal thereby correcting said standard gain spectrum to said standard detector gain.

15. The system of claim 14 wherein:
(a) said spectrum comprises gamma radiation from at least one naturally occurring radioactive element in formation penetrated by a borehole; and
(b) said processor combines said spectrum with calibration constants using a predetermined relationship to obtain an elemental concentration of said at least one naturally occurring radioactive element.

16. The system of claim 15 wherein said at least one elemental concentration is obtained as a function of depth within said borehole.

17. The system of claim 15 wherein said at least one elemental concentration is obtained as a function of azimuthal sector around said borehole.

18. The system of claim 15 wherein said spectrum comprises gamma radiation from potassium, uranium and thorium.

19. The system of claim 13 further comprising a collar, wherein said at least one detector is disposed in a detector channel at the periphery of said collar.

20. The system of claim 13 further comprising a collar, wherein two or more detectors are each disposed within detector channels that are angularly spaced around the periphery of said collar.

21. A method for measuring gamma radiation while drilling a borehole, the method comprising the steps of:
(a) measuring a gamma ray spectrum with at least one gamma ray detector; and
(b) making a first adjustment of gain of said detector using a measure of slope of a Compton scatter region of said spectrum.

22. The method of claim 21 comprising the additional step of making a second adjustment of said gain by:
(a) measuring the location of an energy peak in said spectrum; and
(b) adjusting said gain so that said location corresponds to a standard location for said energy peak.

23. The method of claim 22 comprising the additional step of making a third adjustment of said gain by:
(a) measuring locations of a plurality of energy peaks in said spectrum; and
(b) adjusting said gain so that each said location of each of said plurality of peaks corresponds to a standard location for that peak.

24. The method of claim 23 comprising the additional steps of:
(a) operationally connecting a processor to said at least one detector;
(b) obtaining with said processor said spectrum comprising gamma ray count rate as a function of energy channels; and
(c) making said first adjustment of said gain, within said processor, by adjusting width of said energy channels as a function of said measure of slope.

25. The method of claim 24 comprising the additional step of making said second adjustment of said gain, within said processor, by adjusting said width of said energy channels.

26. The method of claim 25 comprising the additional steps of
(a) providing an adjustable high voltage power supply which cooperates with said processor and with said at least one detector; and
(b) making said third adjustment of said gain by adjusting said adjustable high voltage power supply thereby setting said gain of said at least one detector to a standard gain.

27. The method of claim 26 comprising the additional steps of
(a) measuring said spectrum comprising gamma radiation from at least one naturally occurring radioactive element in formation penetrated by said borehole; and
(b) combining said spectrum with calibration constants in said processor using a predetermined relationship to obtain an elemental concentration of said at least one naturally occurring radioactive element.

28. The method of claim 27 comprising the additional step of obtaining said at least one elemental concentration as a function of depth within said borehole.

29. The method of claim 27 comprising the additional step of obtaining said at least one elemental concentration as a function of azimuthal sector around said borehole.

30. The method of claim 27 wherein said spectrum comprises gamma radiation from potassium, uranium and thorium.

31. The method of claim 21 comprising the additional step of disposing said at least one detector in a detector channel at the periphery of a collar.

32. The method of claim 21 comprising the additional steps of disposing two or more detectors each within detector channels that are angularly spaced around the periphery of a collar.

33. A method for measuring gamma radiation while drilling a borehole, the method comprising the steps of:
(a) measuring a gamma ray energy spectrum with least one gamma ray detector;
(b) disposing a calibration source near or within said at least one detector;
(c) measuring within said gamma ray energy spectrum calibration radiation emitted by said calibration source;
(d) providing a dual gain circuitry comprising a standard amplification circuit and a high gain circuit;
(e) branching said spectrum into said dual gain circuitry thereby producing a standard gain spectrum and an amplified gain spectrum;
(f) in said amplified gain spectrum, observing a position of a calibration peak resulting from said calibration radiation;
(g) comparing said observed position with a predetermined standard position for said calibration peak; and
(h) using comparison to correct said standard gain spectrum to a standard detector gain.

34. The method of claim 33 further comprising the additional steps of:
(a) providing an adjustable high voltage power supply which cooperates with said at least one detector; and
(b) providing a processor that cooperates with said dual gain circuitry and said adjustable high voltage power supply;
(c) making said comparison in said processor;
(d) generating a calibration signal indicative of said comparison;
(e) imputing said calibration signal to said adjustable high voltage power supply; and
(f) adjusting high voltage supplied to said at least one detector by said adjustable high voltage power supply in relation to said calibration signal thereby correcting said standard gain spectrum to said standard detector gain.

35. The method of claim 34 comprising the additional steps of:
(a) measuring said spectrum comprising gamma radiation from at least one naturally occurring radioactive element in formation penetrated by a borehole; and
(b) combining said spectrum with calibration constants in said processor using a predetermined relationship to obtain an elemental concentration of said at least one naturally occurring radioactive element.

36. The method of claim 35 comprising the additional step of obtaining said at least one elemental concentration as a function of depth within said borehole.

37. The method of claim 35 comprising the additional step of obtaining said at least one elemental concentration as a function of azimuthal sector around said borehole.

38. The method of claim 35 wherein said spectrum comprises gamma radiation from potassium, uranium and thorium.

39. The method of claim 33 comprising the additional step of disposing said at least one detector in a detector channel at the periphery of a collar.

40. The method of claim 33 comprising the additional step of disposing two or more detectors each within detector channels that angularly spaced around the periphery of a collar.

41. A gamma radiation logging-while-drilling system for measuring elemental concentration of at least one naturally occurring radioactive element in a formation penetrated by a borehole, the system comprising:
(a) at least one gamma ray detector; and
(b) a calibration source in the vicinity of said at least one gamma ray detector;
wherein said gamma ray detector measures a gamma ray spectrum comprising a first component from said at least one naturally occurring radioactive element and a second component from said calibration source; and
wherein said system is configured to:
determine a first detector gain correction from features of said first component;
determine a second detector gain correction from said second component; and
combine said first and said second gain corrections to correct for gain shifts in said gamma ray detector.

42. The system of claim 41 further comprising a processor, wherein said processor combines features of said first component with calibration constants using a predetermined relationship to obtain said elemental concentration of said at least one naturally occurring radioactive element.

43. The system of claim 42 wherein said at least one elemental concentration is obtained as a function of depth within said borehole.

44. The system of claim 42 wherein said at least one elemental concentration is obtained as a function of azimuthal sector around said borehole.

45. A method for measuring, while drilling a borehole, elemental concentration of at least one naturally occurring radioactive element contained in formation penetrated by said borehole, the method comprising the steps of:
  (a) conveying at least one gamma ray detector within said borehole;
  (b) disposing a calibration source in the vicinity of said at least one gamma ray detector;
  (c) measuring, with said at least one gamma ray detector, a gamma ray spectrum comprising a first component from said at least one naturally occurring radioactive element and a second component from said calibration source;
  (d) determining a first detector gain correction from features of said first component;
  (e) determining a second detector gain correction from said second component; and
  (f) combining said first and said second detector gain corrections to correct for gain shifts in said at least one gamma ray detector.

46. The method of claim 45 comprising the additional step of combining features of said first component with calibration constants using a predetermined relationship to obtain said elemental concentration of said at least one naturally occurring radioactive element.

47. The method of claim 46 comprising the additional step of obtaining said at least one elemental concentration as a function of depth within said borehole.

48. The method of claim 46 comprising the additional step of obtaining said at least one elemental concentration as a function of azimuthal sector around said borehole.

49. A gamma ray logging-while-drilling system comprising:
  (a) at least one gamma ray detector; and
  (b) a processor operationally connected to said at least one detector;
  wherein said gamma ray detector cooperates with said processor to yield a spectrum encompassing a range of about 3 MeV and comprising gamma ray count rate recorded as a function of energy channel.

50. The system of claim 49 further comprising a collar, wherein said at least one detector is disposed in a detector channel at the periphery of said collar.

51. The system of claim 49 further comprising a collar, wherein two or more detectors are each disposed within detector channels angularly spaced around the periphery of said collar.

52. The system of claim 49 wherein:
  (a) said spectrum comprises gamma radiation from at least one naturally occurring radioactive element in formation penetrated by a borehole; and
  (b) said processor combines said spectrum with calibration constants using a predetermined relationship to obtain an elemental concentration of said at least one naturally occurring radioactive element.

53. A method for measuring gamma radiation while drilling a borehole, the method comprising the steps of:
  (a) disposing at least one gamma ray detector within said borehole;
  (b) operationally connecting a processor to said at least one detector; and
  (c) with said processor cooperating with said at least one gamma ray detector, measuring an energy spectrum of said gamma radiation encompassing a range of about 3 MeV and comprising gamma ray count rate recorded as a function of energy channel.

54. The method of claim 53 comprising the additional step of disposing said at least one detector in a detector channel at the periphery of a collar.

55. The method of claim 53 comprising the additional step of disposing two or more detectors within detector channels angularly spaced around the periphery of a collar.

56. The method of claim 53 wherein:
  (a) said spectrum comprises gamma radiation from at least one naturally occurring radioactive element in formation penetrated by a borehole; and
  (b) said spectrum is combined with calibration constants in said processor using a predetermined relationship to obtain an elemental concentration of said at least one naturally occurring radioactive element.

* * * * *